Patented Mar. 24, 1925.

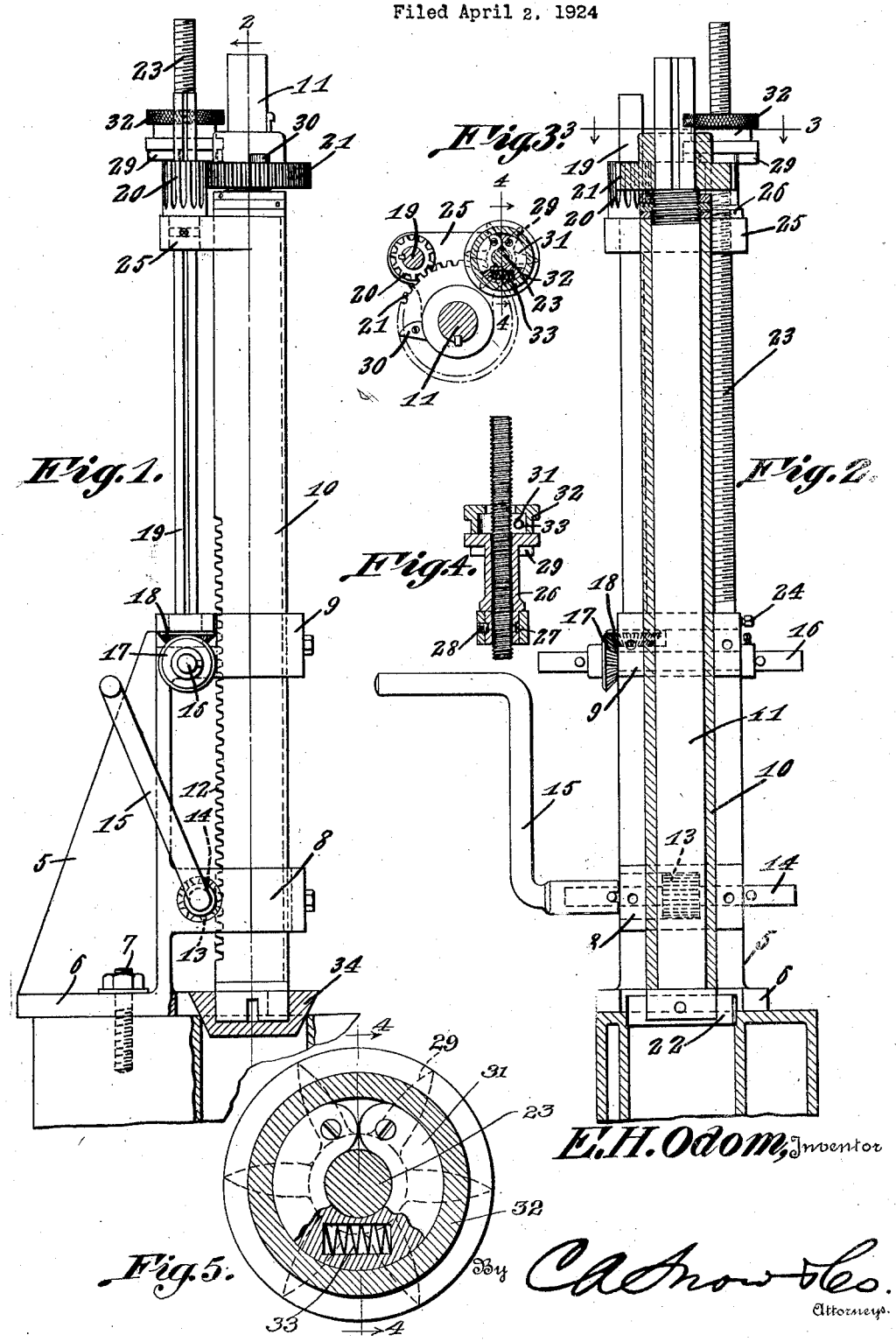

1,530,689

UNITED STATES PATENT OFFICE.

EDWIN HOWARD ODOM, OF ATLANTA, GEORGIA.

BORING MACHINE.

Application filed April 2, 1924. Serial No. 703,752.

*To all whom it may concern:*

Be it known that I, EDWIN H. ODOM, a citizen of the United States, residing at Atlanta, in the county of Fulton and State of Georgia, have invented a new and useful Boring Machine; of which the following is a specification.

The present invention relates to boring machines and more particularly to a portable boring machine especially designed for use in reboring cylinder blocks.

An important object of the invention is to provide a machine of this character having novel means for aligning the boring tool with the walls of the cylinder under operation to insure a true boring of the cylinder.

Another object of the invention is the provision of means for automatically feeding the drill head or tool through its work.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a boring machine constructed in accordance with the invention and disclosing the centering head as positioned in an engine cylinder.

Figure 2 is a sectional view taken on line 2—2 of Figure 1 and disclosing the cutter head.

Figure 3 is a sectional view taken on line 3—3 of Figure 2.

Figure 4 is a sectional view taken on line 4—4 of Figure 3.

Figure 5 is an enlarged sectional view through the sectional nut forming a part of the invention.

Referring to the drawing in detail, the reference character 5 designates the base of the machine, which is formed with lateral flanges 6 provided with openings to receive the securing bolts 7 by means of which the machine may be secured to the engine block to be rebored.

Formed integral with the base 5 are bearing members 8 and 9 through which the tubular member 10 moves, the tubular member supporting the boring bar 11, which is shown as positioned therein.

This tubular member is formed with teeth 12 adapted to be engaged by the gear 13 formed on the shaft 14, which shaft is rotated by means of the crank handle 15 so that the tubular member together with the boring bar may be moved vertically independently of the operating means to be hereinafter more fully described.

Extending into the bearing member 9 is a shaft indicated at 16 which supports a beveled pinion 17 that engages the beveled pinion 18 secured to the lower end of the shaft 19. The upper end of the shaft 19 supports a gear 20 which meshes with the gear 21 splined on the upper end of the boring bar 11 so that upon rotary movement of the shaft 19, rotary movement will be imparted to the gear 21 and boring bar 11 on which the gear 21 is mounted to rotate the boring bar and cause the boring head 22 to operate and accomplish the purpose of the invention.

The feed screw is indicated at 23 and is shown as threaded throughout its length, the lower end thereof being secured to the bearing member 9 by means of the bolt 24. As shown, the upper end of the screw 23 passes through bearing block 25 formed integral with the tubular member 10, where the same supports the sleeve 26 that is provided with a groove 27 adjacent to its lower end for the reception of the screw 28 shown as extending through the bearing block so that the sleeve will be permitted to rotate within the bearing block 25 but be prevented from moving longitudinally of the screw 23 independently of the bearing block.

A star-shaped member 29 is formed at the upper end of the sleeve and is adapted to engage the lug 30 secured to the upper surface of the gear 21 whereby upon each rotation of the gear 21 the lug will engage one of the projections of the star-shaped member to move the sleeve and bearing block supported thereby, one-sixth of a turn.

In order that the sleeve may be connected with the feed screw 23, a sectional nut indicated at 31 is mounted on the upper end thereof, the sections of the nut being held into engagement with the threads of the screw 23 by means of the vertically movable cap 32 that is shown as embracing the nut. A coiled spring 33 is disposed between the sections of the nut and is designed to normally urge the sections away from each other, to the end that when the cap is moved upwardly or out of engagement with the sectional nut, the sections are moved away from each other and disengaged from the threads of the screw 23 to allow the tubular member 10 to be moved upwardly independently of the screw 23.

In order that the machine may be properly positioned with respect to the cylinder to be bored, a removable centering head 34 is provided, the centering head being formed with a central opening to receive the lower end of the tubular member 10. The outer wall of the centering head is tapered so that when the head is positioned in a cylinder, the tapered wall will act to center the tubular member 10 and boring bar 11.

After the tubular member and boring bar have been properly centered, the nuts 35 may be operated to secure the machine to the engine block, whereupon the bar and tubular member 10 bay be moved upwardly and the centering head 34 replaced by the blade 22 employed for accomplishing the boring operation.

In the use of the device, after the machine has been properly centered and the blade 22 positioned for operation, the crank handle 15 is removed from the shaft as shown by Figures 1 and of the drawing and placed on the shaft 16, whereupon the handle is operated to rotate the shaft 18 which imparts rotary movement to the gear 21 that in turn rotates the boring bar 11.

With each rotation of the gear 21, the boring bar is moved slightly downwardly to cause the blade carried at the end thereof to be advanced through the cylinder being bored.

I claim:—

A boring machine including a base, bearing members forming a part of the base, a tubular supporting member operating through the bearing members, a boring bar positioned within the tubular supporting member, a gear at one end of the boring bar, means cooperating with the gear for rotating the boring bar, means for feeding the boring bar through its bearings, a removable centering head adapted to be positioned on one end of the tubular supporting member for centering the boring bar over a cylinder to be bored, and means for securing the base to an engine block.

In testimony that I claim the foregoing as my own, I have hereto affixed my signature in the presence of two witnesses.

EDWIN HOWARD ODOM.

Witnesses:
Jos. F. Bryan,
W. P. Ennis, Jr.